(12) United States Patent
Thaler

(10) Patent No.: US 9,962,740 B2
(45) Date of Patent: May 8, 2018

(54) SELF-ACTUATING DEBRIS REMOVAL DEVICE

(71) Applicant: Ruggenthaler Manufacturing, LLC, Grand Junction, CO (US)

(72) Inventor: Wayne Thaler, Grand Junction, CO (US)

(73) Assignee: Ruggenthaler Manufacturing, LLC, Grand Junction, CO (US)

( * ) Notice: Subject to any disclaimer, the term of this patent is extended or adjusted under 35 U.S.C. 154(b) by 0 days. days.

(21) Appl. No.: 15/080,044

(22) Filed: Mar. 24, 2016

(65) Prior Publication Data

US 2016/0279675 A1    Sep. 29, 2016

Related U.S. Application Data

(60) Provisional application No. 62/138,242, filed on Mar. 25, 2015.

(51) Int. Cl.
| | | |
|---|---|---|
| *B07B 1/52* | (2006.01) | |
| *B08B 1/00* | (2006.01) | |
| *E02B 8/02* | (2006.01) | |
| *C02F 1/00* | (2006.01) | |
| *E02B 5/08* | (2006.01) | |
| *B08B 13/00* | (2006.01) | |

(52) U.S. Cl.
CPC .............. *B07B 1/526* (2013.01); *B08B 1/008* (2013.01); *C02F 1/004* (2013.01); *E02B 5/085* (2013.01); *E02B 8/026* (2013.01); *B08B 13/00* (2013.01)

(58) Field of Classification Search
CPC ......... E02B 8/026; E02B 5/085; B07B 1/526; B01D 29/6469; B01D 29/6484; B01D 33/436
See application file for complete search history.

(56) References Cited

U.S. PATENT DOCUMENTS

| | | | | |
|---|---|---|---|---|
| 3,325,013 A * | 6/1967 | Cyphers | .................. | E02B 8/026 210/159 |
| 4,218,319 A * | 8/1980 | Hansson | ................ | B01D 29/01 210/159 |
| 4,709,804 A * | 12/1987 | Duperon | ................. | E02B 8/026 198/719 |
| 2012/0248018 A1* | 10/2012 | Hopf | .................... | B01D 29/333 210/158 |
| 2013/0240459 A1* | 9/2013 | Andrews | ............ | B01D 29/6469 210/791 |

FOREIGN PATENT DOCUMENTS

WO    WO 0048705 A1 *  8/2000 ............. B01D 29/01

OTHER PUBLICATIONS

WO0048705; Muharemovic, A.; 2000. Machine translation.*

* cited by examiner

*Primary Examiner* — Mikhail Kornakov
*Assistant Examiner* — Natasha N Campbell
(74) *Attorney, Agent, or Firm* — Brownstein Hyatt Farber Schreck, LLP

(57) ABSTRACT

The disclosure relates to a self-actuating debris removal or disruption device for use on a punch plate or other like water screening instrument.

17 Claims, 5 Drawing Sheets

SELF-ACTUATING DEBRIS REMOVAL DEVICE

TECHNICAL FEATURES

The disclosure relates generally to a cleaning apparatus for removal of debris from a punch plate, and more particularly to a self-actuating cleaning device for use in the removal of debris from a punch plate, or other screening structure, where the punch plate or screening structure is used to capture or impede debris in an outdoor irrigation setting.

BACKGROUND

Keeping debris off punch plates or other like water-filters is highly useful for the transport and use of a water supply. Debris in ditch water results in loss of downstream water, increased maintenance costs, particularly where nozzles and pipes are used to distribute the water, and increased potential to distribute weeds, weed seeds, moss, scrub seeds, etc.

One solution for debris removal from a ditch water supply is use of perforated punch plates across the flowing water source. Perforated punch plates capture or impede debris while allowing water to move through the perforated plate and downstream to its end use.

Clogging of perforated plates has become an issue requiring manual debris removal from the plates and, in some cases, actual plate removal and replacement. This is particularly true where the flowing water is remotely located and maintenance time and performance is problematic. Where maintenance is unheeded, flowing water can be significantly impeded to its desired end use.

There is a need for the continual removal or limitation of debris from a punch plate, or other screening device, to maintain a debris limited water supply. The following disclosure is directed at solutions to this problem.

SUMMARY

Embodiments disclosed herein relate to self-actuating debris removing device and to their corresponding methods of use. Device embodiments are typically utilized to remove, unclog or otherwise disrupt debris from punch plates, or other like screening device, in ditch/irrigation water uses. Embodiments herein also include systems, which systems include the self-actuating debris removing device of the disclosure operatively attached to a punch plate, or other screening device, for placement and use in a ditch or irrigation water supply. Device and system embodiments disclosed herein can be positioned in a headgate or other debris sensitive site.

Embodiments described herein allow for removal or minimization of debris from a punch plate or other screen-like structure in ditch water, including removal of debris consistent with outdoor locations. Debris for purposes herein includes: branches, leaves, weeds, moss, grass, rocks, trash, and other debris typically found in outdoor flowing water. Preventing debris from accessing a headgate pipe provides for lower maintenance issues (time and cost) associated with the downstream water, including clogging of pipes, clogging of booms, clogging of nozzles, blocked furrows, and the like. Screening out of debris also provides for increased capture of water, as heavy debris in a flowing water source often results in water loss.

A self-actuating debris removal device in accordance with the present disclosure comprises, a controller programmed to activate a motor and pump which extends a cylinder or other like structure that pushes a scraping blade along the surface of a pre-positioned punch plate thereby scraping off any debris that has accumulated on the surface of the punch plate. In some aspects, the scraping blade forces the debris off the punch plate when it contacts a fixed cleaning blade or bar (thereby scraping the debris off over the cleaning bar). The scraping of debris from the punch plate removes or disrupts blockage from perforations through the punch plate, and thereby allows water to move through the perforations. An appropriately placed end-limit switch is activated on contact with the cleaning-blade (bar), which reverses and returns the scraping-blade to its original starting position. A start-position switch is then tripped when the scraping blade returns to its start position, which stops the movement of the scraping-blade and shuts down the motor until the next actuation cycle. Scraping cycles can be pre-set for timed execution, or can be triggered manually. Scraping cycles can also be triggered by a flow meter or other sensor which actively monitors water flow through the punch plate, i.e., a reduction in water flow across the punch plate triggering the next cycle. Timing of a scraping cycle is typically around forty five seconds to two minutes, and more typically around one minute or so. Timing between scraping cycles can be set as needed but can include, for example, once per hour, once per six hours, once per twelve hours, or once per twenty four hours.

In one embodiment, a battery or batteries, e.g., two parallel batteries, power the motor and pump. In some aspects, the motor and pump are a hydraulic motor and pump. In other aspects, the motor and pump are a mechanical ram. In another embodiment, a 75 watt or more, solar panel is used to charge the one or more batteries, ensuring that the batteries are typically fully charged (typically requires a 2 amp/battery charge to keep batteries fully charged where batteries are used in accordance with the disclosure herein).

In some embodiments, the motor and pump actuate a scraping blade positioned flat and substantially parallel with the punch plate such that the blade scrapes the debris on the punch plate in a downward direction. In other embodiments, the scraping blade is positioned at an angle, for example 30° or 45°, to the punch plate to facilitate the bottom end of the blade to dislodge the debris while the blade surface area pushes the debris away from the punch plate. In this manner the blade pushes the debris downward and away from the punch plate. In either aspect, the scraping plate moves from a position close to, or at the water line, to the bottom edge of the punch plate, the punch plate bottom edge typically located at the ditch channel bottom. In some embodiments the scraping-blade is sized to remove debris from some or all of the punch plate, in other embodiments the scraping-blade is sized to scrape only the middle portion of the punch plate. Alternatively, and with little modification, the scraping-blade could be positioned to start the cycle at the bottom edge of the punch plate and move in an upward direction until reaching the water line and then return to a start position at the bottom edge of the punch plate. Regardless of the start and end position, the scraping-blade is calibrated to scrape along the surface (up or down or for that matter, side to side) of the punch plate to remove or dislodge the debris captured thereto.

In alternative embodiments, the scraping blade moves over the punch plate until it contacts a cleaning blade, the scraped debris is forced off the scraping blade through the interaction with the cleaning blade.

In other embodiments, scraped debris is crushed and scrapped into a size over time that allows for its movement through the punch plate perforations and pipes. However, typical embodiments herein simply allow for the dislodged debris to be pushed away from the punch plate perforations and settle on the bottom of the ditch where it may slowly move downstream of the plate and/or gate. Note that larger debris (branches, larger trash, etc.) or large buildup of debris can always be manually removed from the ditch after being scrapped off of the punch plate, for example, removing debris from the area prior to the punch plate one or more times a week or month.

The present disclosure also provides methods for maintaining water flow through a punch plate, comprising receiving influent water at a punch plate or other like screen; capturing the debris from the water at the influent side of the punch plate; traversing a blade across the influent side of the punch plate to remove the debris from the punch plate, whereby the traversing of the influent side of the punch plate can be timed to occur at pre-determined increments or can be triggered via a reduction in water flow or via a manual override. Alternative methods described herein include attachment of the self-actuating debris removal device to the punch plate and removal of built-up debris from the base of the punch plate.

Finally, the present disclosure also provides self-actuating debris removing systems that include the self-actuating debris removal device in accordance with the present disclosure operatively attached to a punch plate or other like water screening device. Systems can also include a wireless water flow meter to contact a user when manual removal of debris is required, or to contact the controller when the scraping-blade needs to be actuated or requires maintenance, and the like.

DETAILED DESCRIPTION

The following detailed description relates to self-actuating debris removing device and systems, and to the methods of their use. Numerous details are set forth to provide a thorough understanding of the embodiments described herein and in the figures. However, the following descriptions are not intended to limit the embodiments to one preferred embodiment. To the contrary, this application contemplates alternatives, modifications, and equivalents as can be included within the spirit and scope of the described and illustrated embodiments as defined by the appended claims.

In some embodiments, a self-actuating debris removing device is positioned on a perforated punch plate placed in an irrigation ditch, or other like ditch, used to transport water. The perforated punch plate is generally placed parallel to the flow of water in the influent ditch, such that the punch plate covers a gated turn-out of the lateral, and corresponding lateral distribution pipes. A scraping blade is operatively connected to the water input side of the perforated punch plate such that the blade can be actuated to scrape across the input side of the punch plate at timed intervals, or manually controlled to move across the punch plate when directed/needed by a user. The scraping-blade is of a durable material, for example stainless steel, and powered by a power source capable of dislodging common debris from a slow to fast moving water supply. The motor and pump, for example a hydraulic motor, can be powered by various sources including batteries, gas generators, and the like. A punch plate for use herein can include any number, size and orientation of perforations, including square, round, hexagon, slots, and the like. Punch plates can be made of various metal, but typically of steel plate. Typical punch plates herein are stamped out of ¼ inch steel plate, being 4'×4' sheets. The punch plate can be of other useful dimensions as long as it acts to filter water through its various sized perforations. Perforation size can be, for example, ½ inch to 1 inch in diameter, and more typically ¾ inch in diameter.

Figure 1:
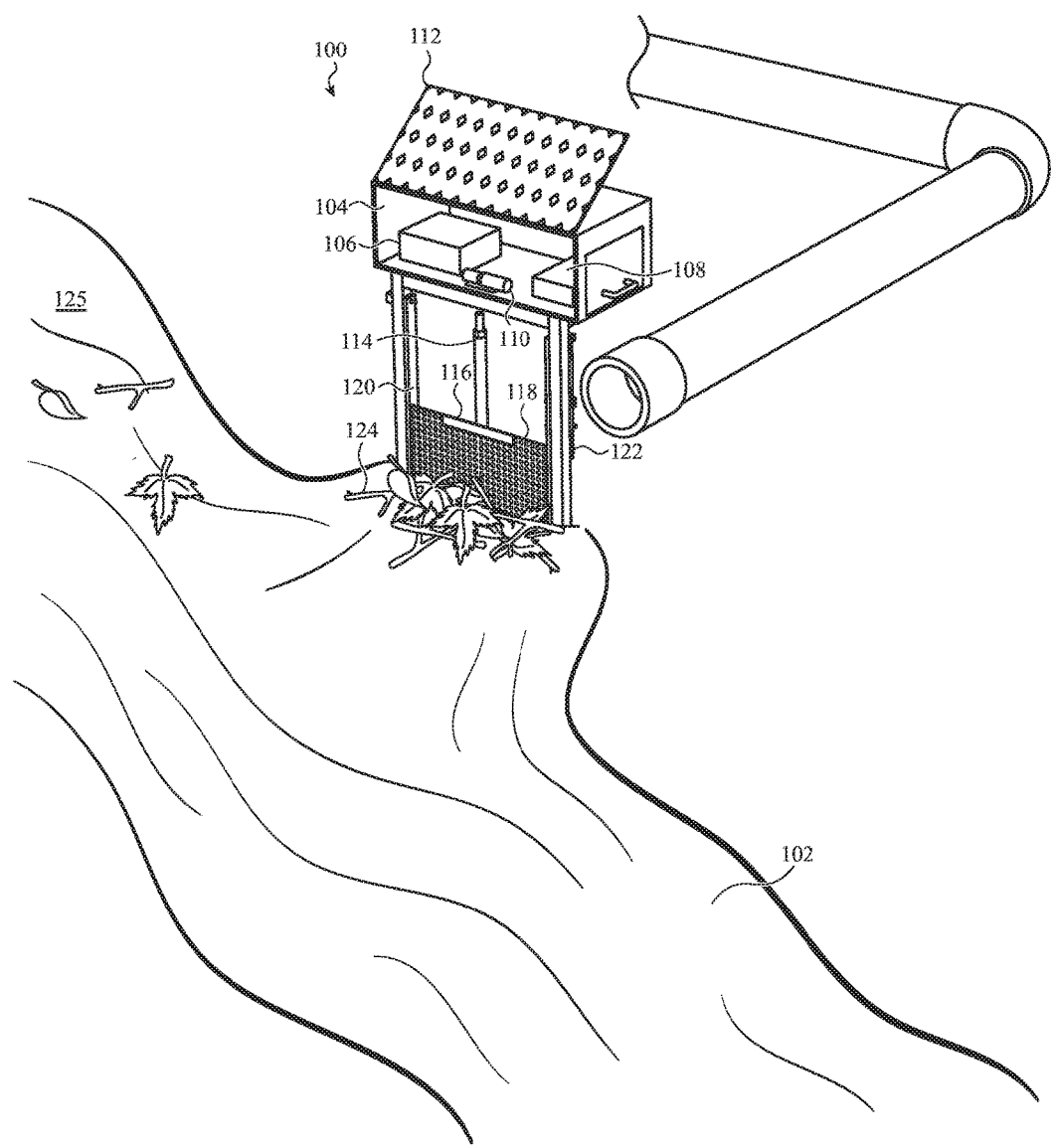
FIG. 1 shows a perspective view of a self-actuating debris removal device positioned in a water ditch in accordance with embodiments described herein.

FIG. 1 is a perspective view of a self-actuating debris removal device 100 positioned in a flowing water source 102, in accordance with some embodiments described herein. A control box 104 houses a controller 106, power storage and generating unit 108, generator (optional and not shown) and hoist motor 110. A solar panel 112 is positioned atop the control box, providing energy to the power storage unit 108 for use in powering the hoist motor 110. In some embodiments the solar panel is hinged to the top of the control box 104, where it can be angled to best capture and convert solar radiation. In some embodiments, the solar panel is attached directly to the top of the control box 104.

A hydraulic cylinder (or other like device) 114 extends from the hoist motor 110 to a scraping blade 116. Although a hoist motor 110 and cylinder 114 are shown in FIG. 1, other motors can be used herein including a mechanical ram pump. The control box 104 is constructed to withstand the outdoor environment, and provide a platform for both housing components of the self-actuating cleaning device and acting as a platform and support for the hoist motor. An illustrative control box is 42" (w)×16"×16" in size, other size boxes can be 36"×18"×18". Other control box dimensions are contemplated, and are within the scope of the present disclosure. In one embodiment, the control box is prepared from a bed steel truck tool box. Typically, the control box is open or has an access door whereby the door can be opened from the ditch bank (door faces the bank, not shown in FIG. 1).

Some embodiments herein include a scraping blade 116 positioned and attached to a punch plate 118 or other like screening plate for actuation by the hydraulic motor via the hydraulic cylinder 114. A bottom edge of the punch plate (not shown in FIG. 1) can define a bar (cleaning bar 117 in FIG. 2A) or plate for acceptance of the fully actuated/extended scraping blade. A pair of guide rails 120 are placed such as to align and direct the movement of the scraping blade in the plane of the punch place. An end-limit switch and an original-limit switch are positioned to signal the reversal and stop positions for the scraping-blade. One or more pairs of control box supports 122 may be used to position the box 104 above the punch plate. In typical aspects, the control box 104 defines an opening (not shown) centered above the punch plate to properly position and allow support and operation of the hydraulic motor through the bottom of the control box via the hydraulic cylinder.

In one embodiment, and in use, the solar panel 112 collects and feeds an appropriate amount of current through the controller 106 for storage in a battery 108 (in some embodiments two or more batteries are used in this capacity). The controller indicates the charging of the battery and the battery percent of charge. A 2 amp charge is sufficient to charge and maintain an appropriate battery (at a peak charge). However, other amounts of current are within the scope of the present disclosure. The controller is set at a pre-determined debris-removal cycle, dependent on the estimated time between which the punch plate requires debris removal. Typical times between debris removal cycles in an irrigation ditch setting includes: 30 minutes, 45 minutes, 60 minutes, 75 minutes, 90 minutes, 105 minutes, 120 minutes, 180 minutes, 240 minutes, 300 minutes, 420 minutes, 720 minutes and the like. As referred to herein, a debris-removal cycle includes one cycle of the scraping blade 116 to the bottom of the punch plate and back to its original starting position (or vice versa). Although not shown, the controller may also be set to receive input from a water flow meter such that a drop in water flow across a punch plate triggers a debris removal cycle regardless of pre-set timing. The water flow meter and controller may communicate wirelessly.

FIG. 1 also illustrates debris 124 build-up on a water input side 125 of the punch plate 118. Upon actuation, the scraping blade moves toward the bottom edge of the water input side of the punch plate, typically starting at the water line and moving vertically toward the bottom edge of the punch place positioned on the floor of the water ditch. The scraping bar moves at a rate of 30" to 2'/cycle, more typically 45" to 90"/cycle. As discussed previously, the scraping blade may also be positioned to start a cycle from the bottom edge of the punch plate and move upward to the water line and then back to its starting position.

Typical scraping-blades extend across all or a portion of the punch plate. For illustrative purposes, in some aspects the scraping-blade may be 6 to 42 inches in length for a 42 inch wide punch plate, and in other embodiments the scraping blade may be from 8 to 28 inches in length for a 42 inch wide punch plate. In still other embodiments, the scraping-blade is approximately 10-16 inches in length, for example 12 inches in length for a 42 inch wide punch plate. In one embodiment, the scraping-blade can be attached to the bottom of a piece of metal attached to the cleaner. The Scraping blade can be 40 inches long and 6 inches wide and can be beveled 45° in the middle where it comes into contact with the punch plate. Typical scraping blades are made of stainless steel, although other materials can also be used, for example, galvanized steel or other alloy metals. As such, scraping blades may cover 10% to 100% of the width of a punch plate, and more typically from 25% to 100% of the width of a punch plate and most typically, from 50% to 100% of the width of a punch plate.

Cleaning bars in accordance with embodiments herein may have a similar size and width as discussed for the scraping blade. Cleaning bars are also typically made of a durable metal, such as stainless steel.

Figure 2B:
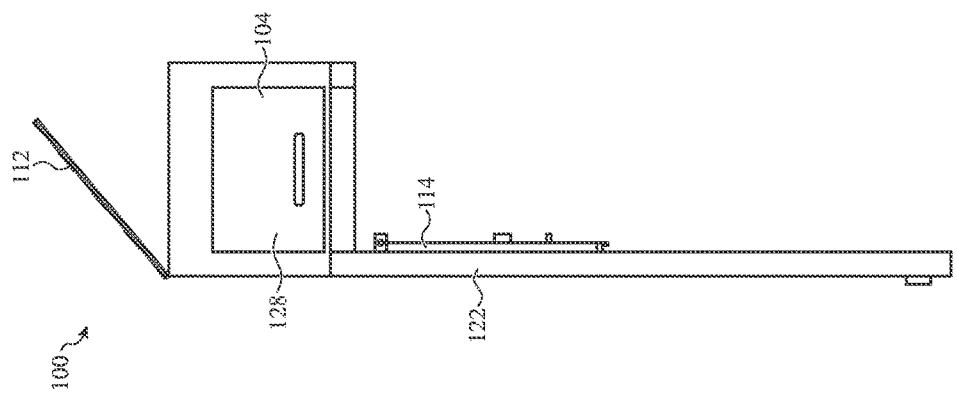
FIG. 2B shows a side view of the self-actuating debris removal device in accordance with embodiments described herein.
Figure 2A:
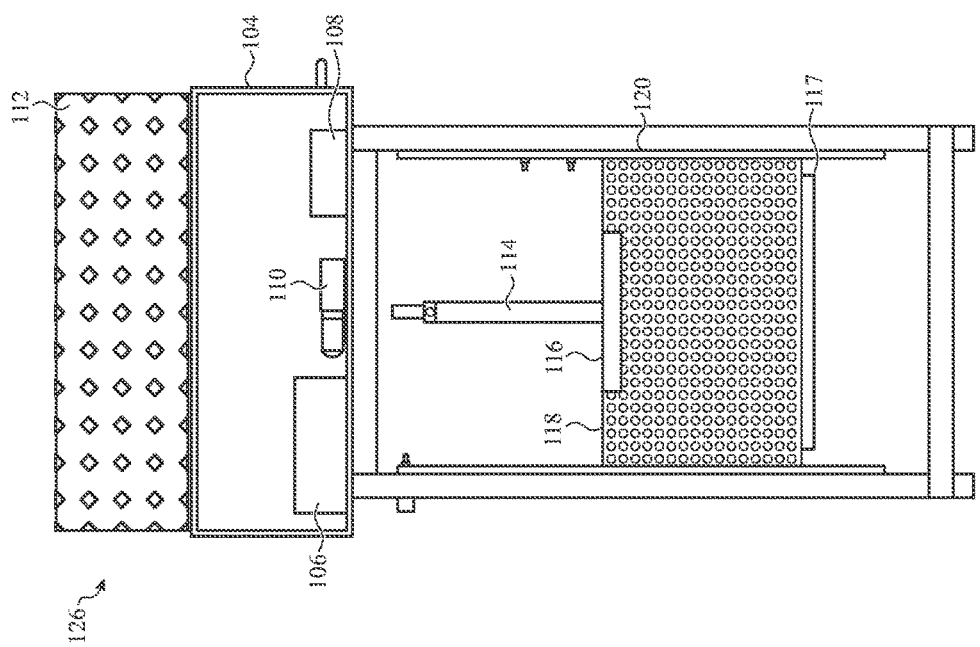
FIG. 2A shows a front view of the self-actuating debris removal device in accordance with embodiments described herein.

FIG. 2A shows a front view of a self-actuating debris removing system 126 in accordance with embodiments herein. A self-actuating debris removing system 126, typically includes a self-actuating debris removing device 100 in combination with at least a punch plate. FIG. 2A shows the control box 104, with connected solar panel 112, a battery 108, controller 106, hydraulic hoist 110, hydraulic cylinder (operatively connecting the hydraulic hoist to the scraping-blade) 114, scraping-blade guide rails 120, control box supports 122, and punch plate 118 in accordance with the present disclosure. Systems of the present disclosure can also include a wireless water flow meter (not shown) for signaling the controller or a user (or potentially the irrigation company) as to the water flow speed on the output side of the punch plate, a manual override access for manually triggering the hydraulic hoist from the exterior of the control box (not shown), and the like.

FIG. 2B shows a side view of a self-actuating debris removing device 100 in accordance with embodiments herein. Although two control box supports are shown, three or four may be used. A control box and solar panel sit atop the punch plate proving an efficient operational setting for the hydraulic hoist. Control box embodiments typically include an access door on the bank side of the device for convenient user access.

Figure 3:
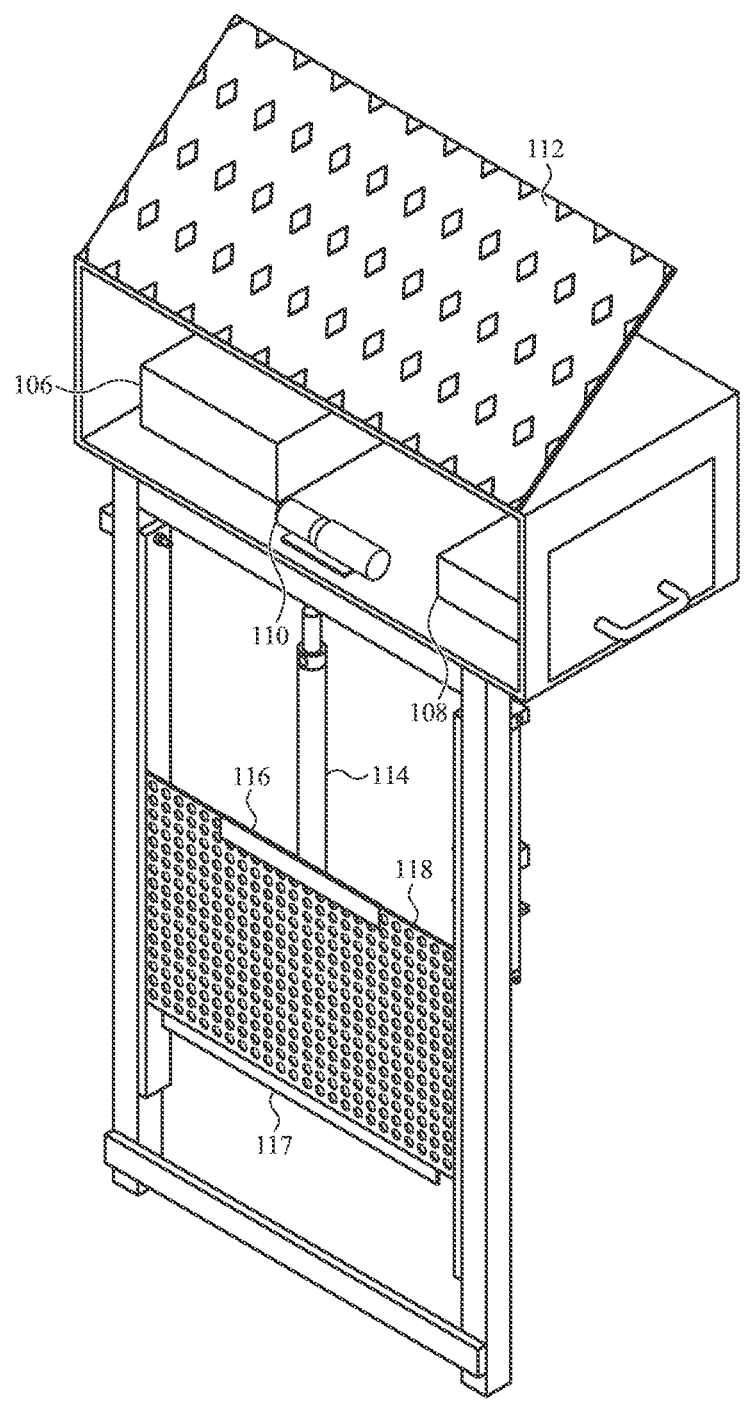
FIG. 3 shows a perspective view of the self-actuating debris removal device in accordance with embodiments described herein.

FIG. 3 provides another perspective view of the self-actuating debris removal system in accordance with embodiments described herein. The self-actuating debris removal device is operationally connected to a punch plate which could be placed in an irrigation ditch or headgate structure. Self-actuating debris removal device in accordance with embodiments herein can have a control box for housing a battery, controller and hydraulic hoist. The hydraulic hoist is positioned in the box for direct connectivity to a hydraulic cylinder and the scraper-blade of the disclosure. Some variation to the design shown in FIG. 3 can be envisioned including replacement of the hydraulic hoist with a mechanical ram for actuation of the scraping-blade, alternative placement or sizing of the scraping-blade, alternative power generating device, and the like.

In some embodiments, the scraper blade 116 moves until it contacts a cleaning bar 117 so as to facilitate removal of the debris off the face of the punch plate.

Figure 4:
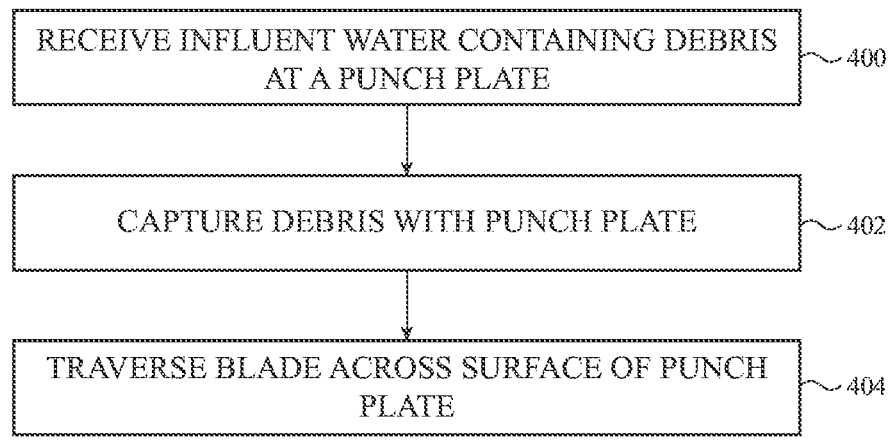
FIG. 4 shows a flow chart for debris removal from a punch plate, or other like filter, in accordance with debris-removal methods described herein.

FIG. 4 shows a flow chart for maintaining water flow in an irrigation or other like ditch. In step 400 the ditch influent water is received where the water has some level of potential debris. In step 402 the debris is captured at a punch plate that screens the influent water. In step 404 the punch plate is traversed with a scraping-blade for disruption or removal of the captured debris. In addition, methods may include placement of the blade on the punch plate prior to or after placement of the punch plate in the influent containing water.

Example

The following example is provided for illustrative purposes only and is not intended to limit the scope of the disclosure.

Example

Figure 5:
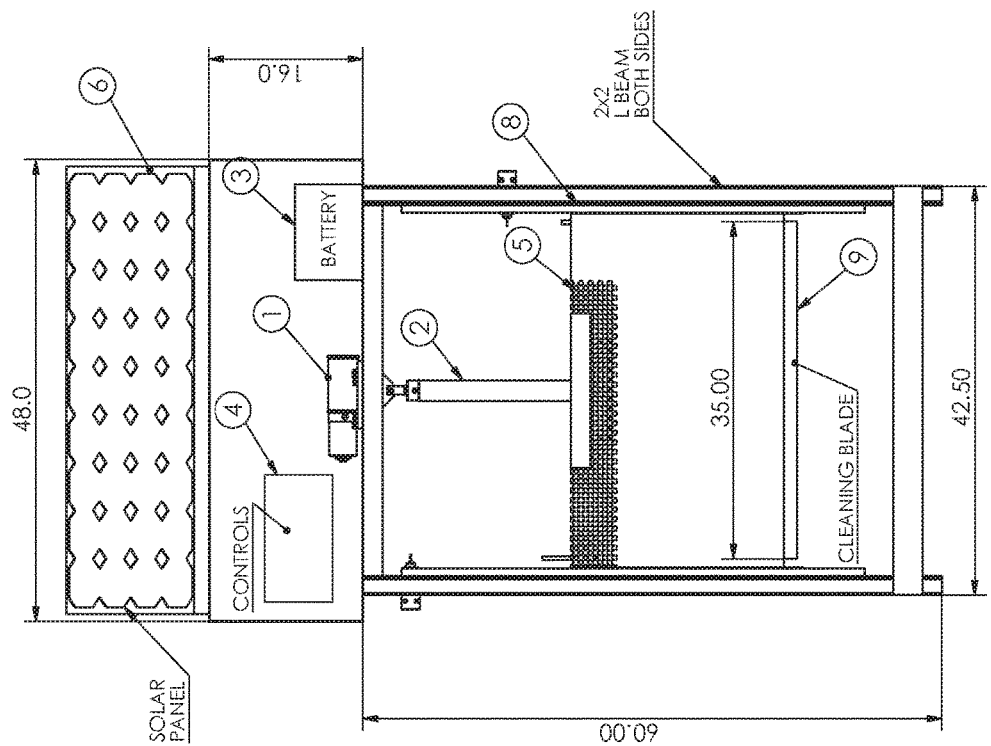
FIG. 5 illustrates a typical embodiment of the device and system herein.
Figure 5:
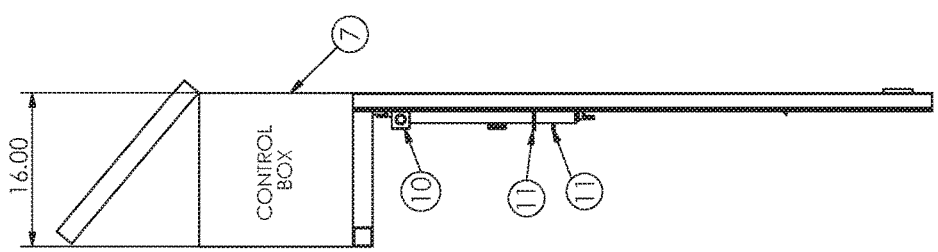

FIG. 5 provides one illustrative self-actuating debris removal system with corresponding parts. The self-actuation device and system shows illustrative parts in Table 1 and size dimensions in FIG. 5.

TABLE 1

Illustrative Parts List

| Item No. | Description | Quantity |
|---|---|---|
| 1 | Hydraulic Motor and Pump | 1 |
| 2 | Hydraulic Cylinder (Ram) | 1 |
| 3 | Battery | 2 |
| 4 | Control Panel | 1 |
| 5&9 | Screen and Cleaning Bar | 1 |
| 6 | Solar Panel (75 Watt or more) | 1 |
| 7 | Secure Lock or Control Box | 1 |
| 8 | Plastic Lined Steel Guides and Steel Support Legs | 2 or more |
| 10 | Hydraulic Ram Connector Bracket | 1 or more |
| 11 | Limit Switches | 2 or more |

In this illustrative embodiment, limit switches are shown and the control panel is shown extending off an inside side panel of the control box.

What is claimed is:

1. A self-actuating debris removal device for removing or disrupting debris from a punch plate, the device comprising:
    a scraping blade disposed relative to the punch plate;
    an actuator operatively connected to the scraping blade and configured to move or scrape the scraping blade across a water input surface of the punch plate;
    a cleaning bar fixed to the input surface of the punch plate; and
    a controller for controlling the actuator to cause the scraping blade to move across the input surface of the punch plate until the scraping blade contacts the cleaning bar;
    wherein the controller is set to cause movement of the scraping blade across the input surface of the punch plate until contact with the cleaning bar and back at timed intervals or under predetermined conditions.

2. The self-actuating debris removal device of claim 1 further comprising a battery for providing sufficient power to the actuator for movement of the scraping blade across the water input surface of the punch plate.

3. The self-actuating debris removal device of claim 2 further comprising a solar panel for maintaining the battery in a fully charged condition.

4. The self-actuating debris removal device of claim 2 wherein the actuator is a hydraulic hoist.

5. The self-actuating debris removal device of claim 4 wherein the hydraulic hoist operatively connects and actuates the scraping blade through a hydraulic cylinder.

6. The self-actuating debris removal device of claim 4 further comprising a start-position switch and an end-limit switch, wherein the end-limit switch signals a reversal position for the scraping blade to return to the position of the start-position switch.

7. The self-actuating debris removal device of claim 6 further comprising a pair of scraping blade guide rails for guiding the scraping blade along a predetermined path of the punch plate.

8. The self-actuating debris removal device of claim 7 further comprising a control box supported by two or more support legs;
    wherein the control box houses at least the controller and the hydraulic hoist and wherein the control box positions the controller and hydraulic hoist above the punch plate.

9. A self-actuating debris removal system, comprising:
    a self-actuating debris removal device comprising a scraping blade, an actuator and a controller; and
    a punch plate having a cleaning bar affixed thereto;
    wherein the scraping blade is operatively attached to both the actuator and punch plate and wherein the actuator controls the movement of the scraping blade across a surface of the punch plate until the scraping blade contacts the cleaning bar.

10. The self-actuating debris removal system of claim 9 further comprising a debris collector wherein the debris collector is positioned at the base of the punch plate for capture and storage of debris scraped off the punch plate by the scraping blade.

11. The self-actuating debris removal system of claim 9 further comprising a battery for providing power to the actuator.

12. The self-actuating debris removal system of claim 11 further comprising a solar panel for collecting solar energy sufficient to charge and run the battery.

13. The self-actuating debris removal system of claim 9 further comprising a water flow meter, wherein the water flow meter triggers actuation of the scraping blade under predetermined water flow conditions.

14. A method of facilitating water flow through an irrigation ditch head gate, comprising:
    positioning a self-actuating debris removal device on a punch plate, wherein the self-actuating debris removal device comprises a scraping blade, and wherein the punch plate further comprises a cleaning bar;
    positioning the self-actuating debris removal device and punch plate at a head gate of the irrigation ditch; and
    setting parameters of when to actuate the scraping blade to scrape across a water input surface of the punch plate until contact with the cleaning bar, based on water flow conditions of the irrigation ditch;
    wherein, the self-actuating debris removal device is operational when the parameters to actuate the scraping blade are accomplished.

15. The method of claim 14 wherein the setting the parameters of when to actuate the scraping blade further comprise data from a water flow meter.

16. The method of claim 14 wherein the setting the parameters of when to actuate the scraping blade further comprise a periodically timed interval.

17. The method of claim 14 wherein the self-actuating debris removal device is powered by solar radiation.

* * * * *